(12) United States Patent
Volker

(10) Patent No.: US 10,945,421 B2
(45) Date of Patent: Mar. 16, 2021

(54) BAIT HOLDER WITH BAIT CUTTER

(71) Applicant: Paul Volker, Andover, MN (US)

(72) Inventor: Paul Volker, Andover, MN (US)

( * ) Notice: Subject to any disclaimer, the term of this patent is extended or adjusted under 35 U.S.C. 154(b) by 0 days.

(21) Appl. No.: 16/783,681

(22) Filed: Feb. 6, 2020

(65) Prior Publication Data

US 2020/0170232 A1 Jun. 4, 2020

Related U.S. Application Data

(62) Division of application No. 15/404,863, filed on Jan. 12, 2017, now Pat. No. 10,588,304.

(60) Provisional application No. 62/278,716, filed on Jan. 14, 2016.

(51) Int. Cl.
| | | |
|---|---|---|
| A01K 97/00 | (2006.01) | |
| A01K 97/04 | (2006.01) | |
| A01K 99/00 | (2006.01) | |
| B65D 43/06 | (2006.01) | |
| B65D 43/12 | (2006.01) | |
| B65D 51/18 | (2006.01) | |

(52) U.S. Cl.
CPC ............ *A01K 97/045* (2013.01); *A01K 99/00* (2013.01); *B65D 43/065* (2013.01); *B65D 43/12* (2013.01); *B65D 51/18* (2013.01); *B65D 2251/009* (2013.01); *B65D 2251/0018* (2013.01); *B65D 2251/0028* (2013.01); *B65D 2251/0081* (2013.01)

(58) Field of Classification Search
CPC ...... A01K 97/04; A01K 97/045; A01K 97/05; A01K 99/00; B65D 41/28; B65D 43/0204; B65D 43/0212; B65D 43/0222; B65D 43/0274; B65D 2543/00

USPC .............................................. 43/54.1, 55–57
See application file for complete search history.

(56) References Cited

U.S. PATENT DOCUMENTS

| | | | |
|---|---|---|---|
| 1,964,290 A | 6/1934 | Krause | |
| 2,076,157 A | 4/1937 | Perkins et al. | |
| 2,614,358 A * | 10/1952 | Adams | A01K 97/05 43/55 |
| 3,751,845 A * | 8/1973 | van Leeuwen | A01K 97/06 43/56 |
| 4,567,995 A * | 2/1986 | Kreiseder | B65D 47/265 220/253 |
| 4,598,837 A * | 7/1986 | Kreiseder | B65D 47/265 220/214 |
| 4,733,589 A | 3/1988 | Wolff | |
| 4,794,670 A | 1/1989 | Savastano, Jr. | |
| 5,117,571 A * | 6/1992 | Sites | A01K 97/04 43/4 |
| 5,205,778 A | 4/1993 | Korkuch | |
| 5,720,124 A | 2/1998 | Wentzell et al. | |
| 6,453,602 B1 * | 9/2002 | Russell | A01K 69/06 43/100 |

(Continued)

OTHER PUBLICATIONS

"U.S. Appl. No. 15/404,863, Preliminary Amendment filed Jan. 20, 2017", 3 pgs.

(Continued)

*Primary Examiner* — David J Parsley
*Assistant Examiner* — Danielle A Clerkley
(74) *Attorney, Agent, or Firm* — Schwegman Lundberg & Woessner, P.A.

(57) ABSTRACT

A bait holder includes a multi-purpose lid that has a sliding portion operable to both cut and enclose bait within a bait container.

7 Claims, 5 Drawing Sheets

(56) References Cited

U.S. PATENT DOCUMENTS

| | | |
|---|---|---|
| 6,802,149 B1 | 10/2004 | Albanese, Jr. et al. |
| 8,667,878 B1 | 3/2014 | Lu |
| 9,615,563 B2 | 4/2017 | Fontaine |
| 10,588,304 B2 | 3/2020 | Volker |
| 2003/0005617 A1* | 1/2003 | Holverson, Jr. ... B65D 43/0212 43/41 |
| 2005/0127075 A1* | 6/2005 | Smith ................ B65D 43/0212 220/253 |
| 2011/0100179 A1 | 5/2011 | Burke et al. |
| 2013/0047809 A1 | 2/2013 | Paturel |
| 2014/0047964 A1 | 2/2014 | Zhao |
| 2014/0345187 A1* | 11/2014 | Fontaine ................ A01K 97/04 43/55 |
| 2017/0202195 A1 | 7/2017 | Volker |

OTHER PUBLICATIONS

"U.S. Appl. No. 15/404,863, Restriction Requirement dated Oct. 5, 2018", 6 pgs.

"U.S. Appl. No. 15/404,963, Response filed Nov. 26, 2018 to Restriction Requirement dated Oct. 5, 2018", 6 pgs.

"U.S. Appl. No. 15/404,863, Non Final Office Action dated Jan. 10, 2019", 8 pgs.

"U.S. Appl. No. 15/404,863, Response filed Feb. 20, 2019 to Non Final Office Action dated Jan. 10, 2019", 7 pgs.

"U.S. Appl. No. 15/404,863, Final Office Action dated Aug. 6, 2019", 8 pgs.

"U.S. Appl. No. 15/404,863, Response filed Oct. 7, 2019 to Final Office Action dated Aug. 6, 2019", 7 pgs.

"U.S. Appl. No. 15/404,863, Notice of Allowance dated Nov. 6, 2019", 11 pgs.

\* cited by examiner

BAIT HOLDER WITH BAIT CUTTER

RELATED APPLICATIONS

This application is a Division of U.S. patent application Ser. No. 15/404,863, filed on Jan. 12, 2017, which claims the benefit of priority to U.S. Provisional Application Ser. No. 62/278,716, filed on Jan. 14, 2016, the disclosures of each of which are incorporated herein by reference in their entireties.

BACKGROUND

Bait is used in fishing as a means to entice fish to bite into a hook and become set on the hook. Many times, the bait is larger than desired and may be cut to an appropriate size. Commercial bait cutters may include a steel housing and adjustable blades to cut large amounts of bait to different selectable lengths. Such commercial bait cutters utilize hydraulic motors and may weight over 20 kgs.

When worms are used as bait, knives or even fingernails may be used to cut the worms to a desired size. The worms are removed from bait containers and cut. The unused portion of the worm may be thrown away, or returned to the bait container.

SUMMARY

A bait holder includes a multi-purpose lid that operates to both cut and enclose bait within a bait container.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

Figure 1:
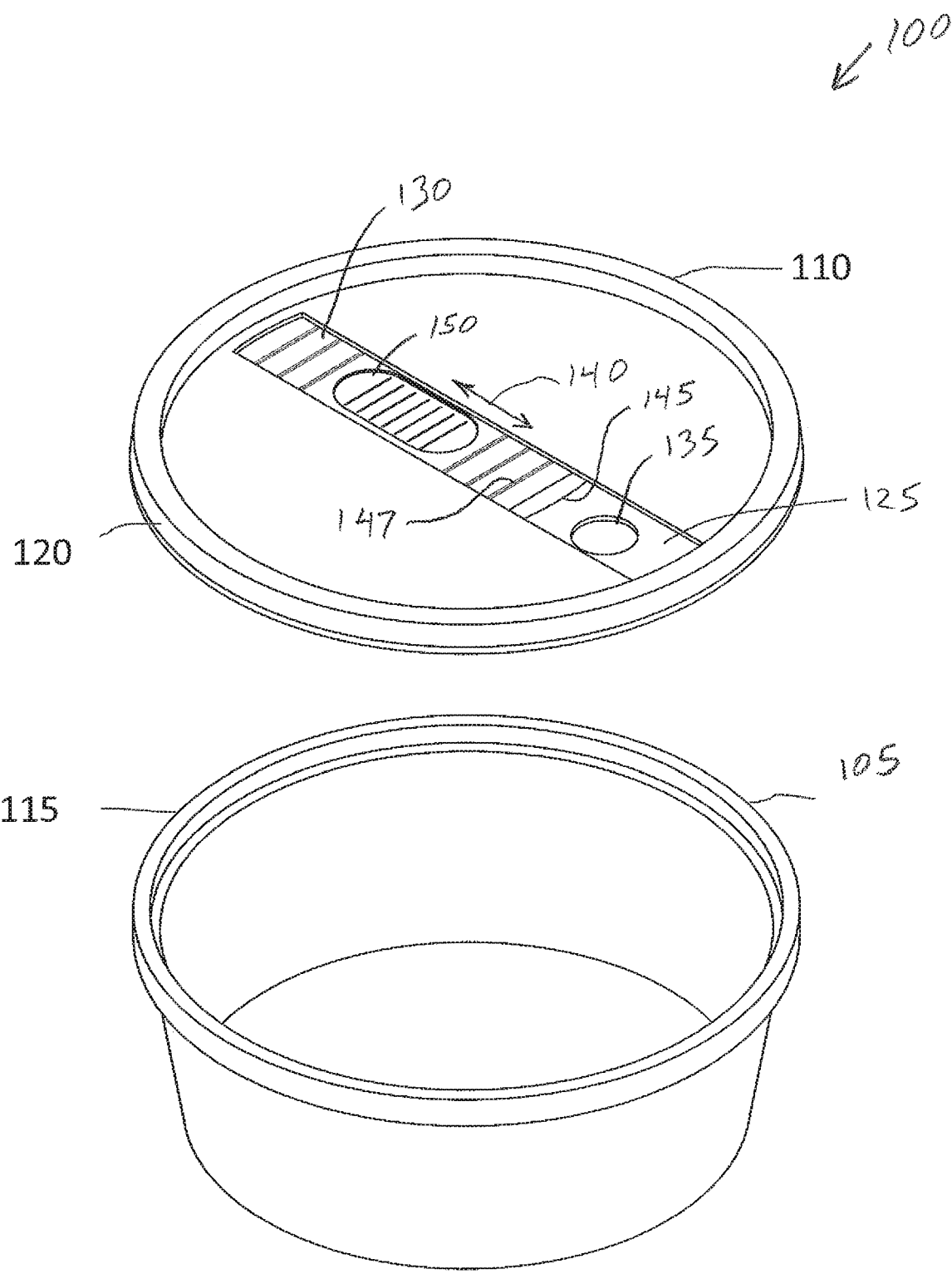
FIG. 1 is an exploded perspective view of a bait holder with a container and a lid for cutting bait according to an example embodiment.

FIG. 1 is an exploded perspective view of a bait holder 100 including a bait container 105 with a lid 110 for cutting bait according to an example embodiment. In one embodiment, bait container 105 is formed as a cylindrical container having a reinforced lip 115. Walls of the cylindrical container may be sloped inward from the lip 115 in some embodiments, enabling easy stacking of multiple containers 105 and an easier grip for a user. The container 105 may be formed of Styrofoam or plastic in various embodiments. While the container 105 is shown as cylindrical or partial cone shaped, it may also have a different shape, such as generally square or rectangular with rounded corners and a cross section that decreases similarly to the partial cone shaped container shown. Similarly, containers and lids may have a polygonal shape with at least three sides, which need not be equal in length.

Lid 110 in one embodiment has a lip 120 formed to mate with the lip 115 of the container 105. The lid 110 may also be formed of Styrofoam or plastic as desired. Lid 110 has a generally rectangular shaped insert 125 with a lateral sliding portion 130 that slides across an opening 135 to cut bait that is partially inserted into the opening 135. The lid may be coupled to the container 105 during a sliding and cutting operation. The sliding portion may be formed of plastic that is thin enough to cut the bait, but thick enough to provide adequate structural integrity. The operation of sliding the siding portion across opening 135 results in two functions being performed. First, the bait is cut by the sliding portion moving across the opening. Second, the container is sealed upon the sliding portion moving across the opening resulting in the bait being cut and the container being sealed in a single movement.

In one embodiment, the sliding portion is captured within two layers of the lid 110 that capture the sliding portion 130 and allow it to move back and forth across the opening 135 as indicated by an arrow 140. A leading edge 145 of the sliding portion 130 may be curved slightly to facilitate cutting of the bait. In some embodiments, the leading edge may be thinned to provide a sharper cutting edge. Ridges 147 or other structural integrity enhancing structures may be included in the sliding portion 130. The sliding portion 130 may also have a raised portion 150 located partway between the leading edge 145 and a trailing edge to facilitate movement of the sliding portion 130 by a finger of a user and hence cutting of the bait by the leading edge 145. The raised portion 150 may vary in height and may be shaped in a race track or simply be a ridge or other structure suitable for applying sufficient force to move the sliding portion 130 and cut the bait. The lid 110 and sliding portion 130 may be vacuum molded from plastic in various embodiments, or otherwise formed of plastic or another material, such as metal or even wood.

Figure 2:
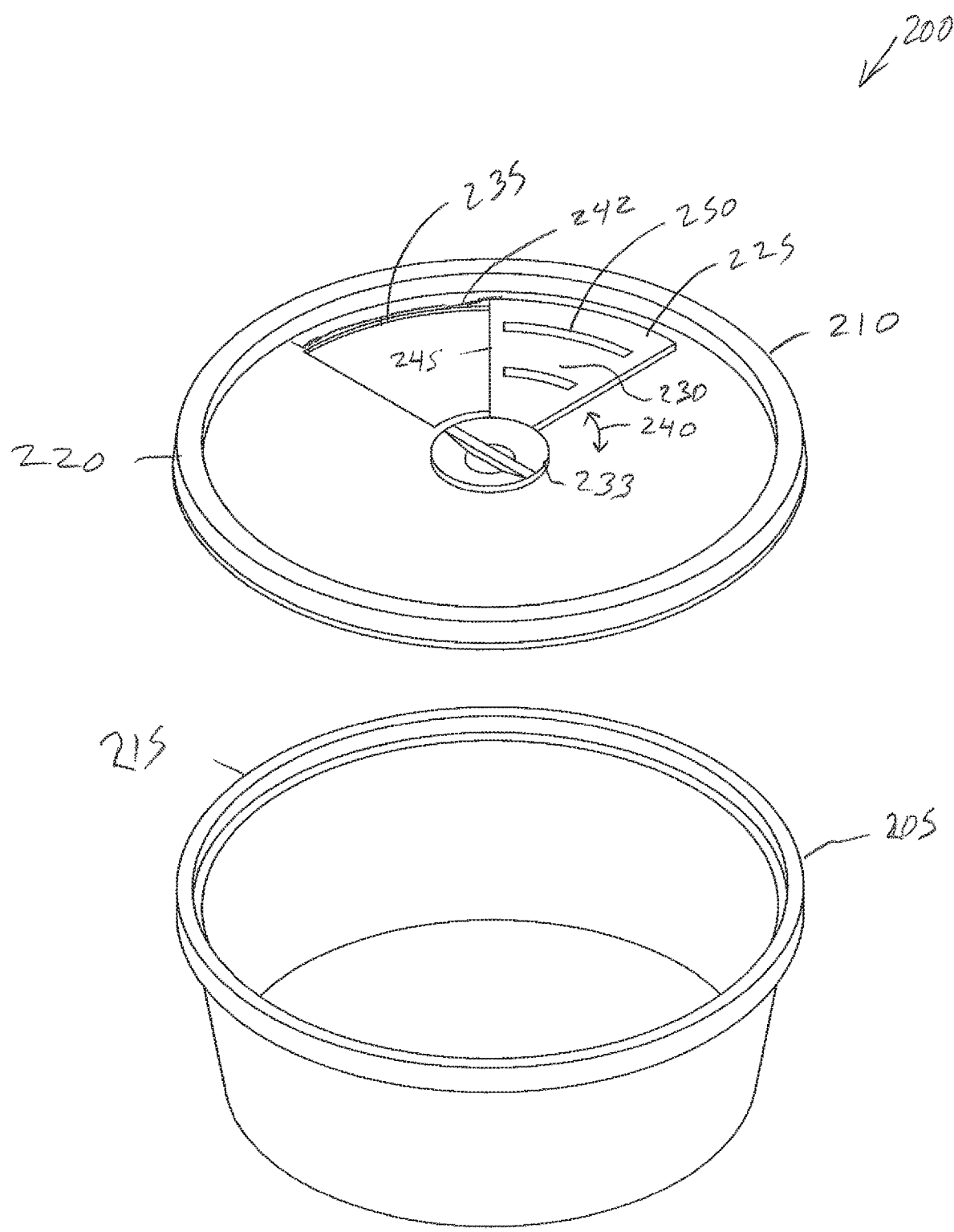
FIG. 2 is an exploded perspective view of a bait holder with an alternative lid for cutting bait according to an example embodiment.

FIG. 2 is an exploded perspective view of a bait holder 200 with a container 205 and an alternative lid 210 for cutting bait according to an example embodiment. In one embodiment, bait container 205 is formed as a cylindrical container having a reinforced lip 215. Walls of the cylindrical container may be sloped inward from the lip 215 in some embodiments, enabling easy stacking of multiple containers 205 and an easier grip for a user. The container 205 may be formed of Styrofoam or plastic in various embodiments.

Lid 210 in one embodiment has a lip 220 formed to mate with the lip 215 of the container 205. The lid 210 may also be formed of Styrofoam or plastic as desired. Lid 210 has an insert 225 with a lateral rotating portion 230 that rotates about an axial connection 233 to the lid 210 such that the portion 230 slides across an opening 235 to cut bait that is partially inserted into the opening 235. In one embodiment, the rotating portion is triangularly shaped with two sides extending from the axial connection 233 toward the lid 210 circumference, and third side formed in an arc near the periphery of the lid. The lid 210 may be coupled to the container 205 during a sliding/rotating and cutting operation. The rotating portion 230 may be formed of plastic that is thin enough to cut the bait, but thick enough to provide adequate structural integrity. The operation of sliding the siding portion across opening 235 via rotation results in two functions being performed. First, the bait is cut by the rotating portion 230 moving across the opening 235. Second, the container 205 is sealed upon the rotating portion moving across the opening resulting in the bait being cut and the container 205 being sealed in a single movement.

In one embodiment, the rotating portion 230 is captured by axial connection 233, such as a rivet, allowing the rotating portion 230 to rotate back and forth across the opening 235 as indicated by a curved arrow 240. The lid 210 may have a lateral crevice 242 about an outer periphery of the opening 235 to capture the rotating portion 230 to help maintain the rotating portion against the lid 210. A leading edge 245 of the rotating portion 230 may be curved slightly to facilitate cutting of the bait. The rotating portion 230 may also have a raised portion 250 located partway between the leading edge 245 and a trailing edge to facilitate movement of the sliding portion 230 by a finger of a user and hence cutting of the bait by the leading edge 245. The raised portion 250 may vary in height and may be shaped in a race track or simply be a ridge or other structure suitable for applying sufficient force to move the rotating portion 230 and cut the bait. The lid 210 and rotating portion 230 may be vacuum molded from plastic in various embodiments, or otherwise formed of plastic or another material, such as metal or even wood.

In the case of a container that is generally square or rectangular shaped, the lid 201 is shaped to cover the container and the rotating portion and opening may be positioned such that the lid does not interfere with the rotating portion. For instance, the rotating portion and opening may be positioned via an axial connection that is located near an edge of the square lid such that the rotating portion and opening are spaced inward from the edge. The axial connection may also be located inward from an edge or corner of the lid such that the opening and rotating portion extend toward an edge or corner of the lid. Many configurations may be utilized in various embodiments to provide a suitable relative motion between the opening and rotating portion that are not interfered with by the lid.

Figure 3:
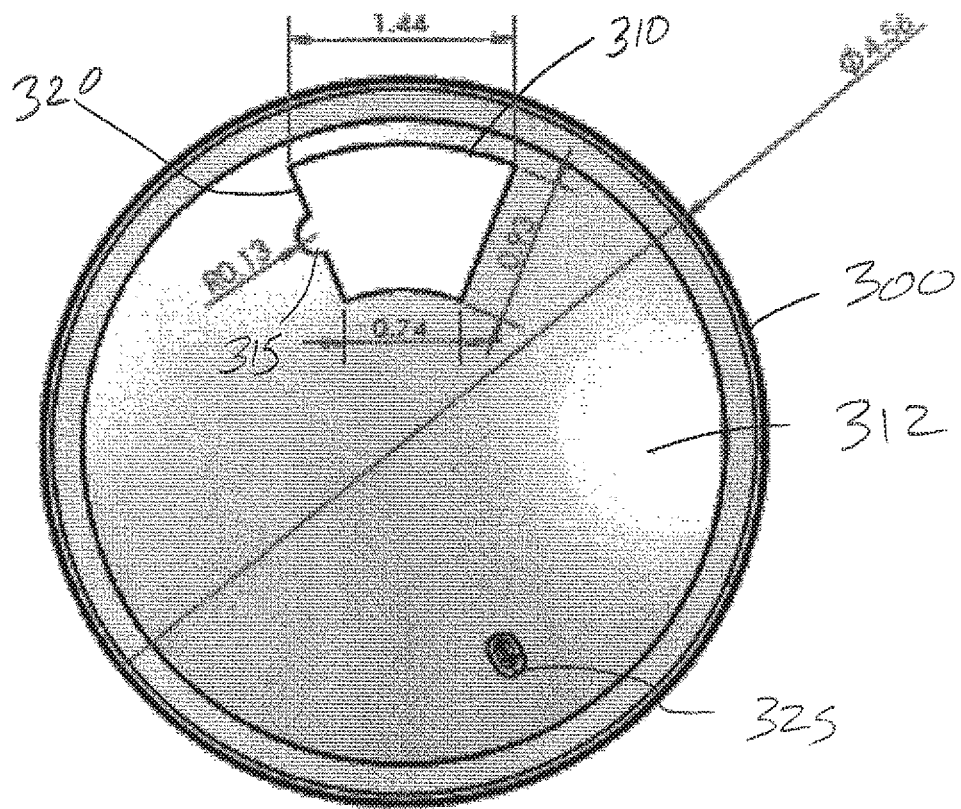
FIG. 3 is a top view of an alternative bait container lid having an opening for providing access to and cutting bait in the container according to an example embodiment.

FIG. 3 is a top view of a bait container lid 300 having an opening 310 for providing access to and cutting bait in a container according to an example embodiment. The lid 300 has an inner portion 312 that mates with an insert shown later. An insert shown in figures below provides a rotating portion to make with the container lid 300 for cutting the bait. In one embodiment, lid 300 includes a curved bait cutting guide 315 on an end 320 of the opening 310 that serves to both guide a user in where to place the bait and secures the bait for the cutting operation as the insert is rotated. In one embodiment, the guide 315 is a half circle or semi-circle in shape and is placed near a center of the end 320. A radius of the guide may be similar to an average radius of bait to be cut in one embodiment. Other shapes may also be utilized, such as a triangle or square shaped perimeter for the guide.

A projection 325 may also be formed on the lid 300 in a position to mate with a groove or structure of the insert to be placed on the lid and rotated. The projection 325 may operate as a stop for controlling the amount of rotation of the insert in some embodiments, and may also in conjunction with the insert structure serve as a soft, deformable locking mechanism to keep the insert in a position to maintain covering of the opening 310.

Figure 4:
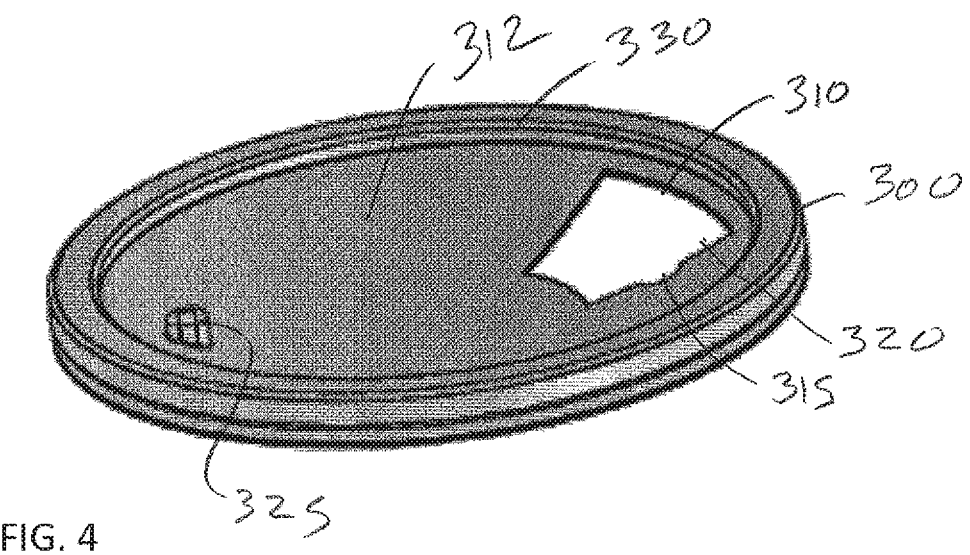
FIG. 4 is a perspective view of the bait container lid of FIG. 3 according to an example embodiment.

FIG. 4 is a perspective view of the bait container lid 300 of FIG. 3. In some embodiments, the lid 300 has an annular ridge 330 that serves as a snap fit retention mechanism for capturing the insert and allowing rotation of the insert. The size of the ridge 330 or other structure may depend on the deformability of the materials used for the lid and insert, which may be similar to the materials described with respect to the previous embodiments.

Figure 5:
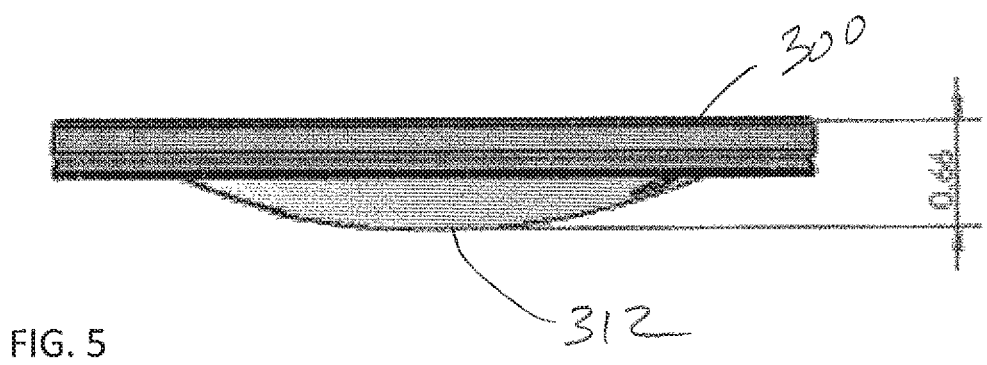
FIG. 5 is a side view of the bait container lid of FIG. 3 according to an example embodiment.

FIG. 5 is a side view of the bait container lid 300 of FIG. 3. Note that the inner portion 312 may be at least partially dome shaped, extending inward towards a container or outward from the container on which the lid 300 may be placed to cover the container. The dome shape may provide structural integrity to the lid 300 in some embodiments. In other embodiments, the lid 300 may be partially planar or completely planar.

Figure 6:
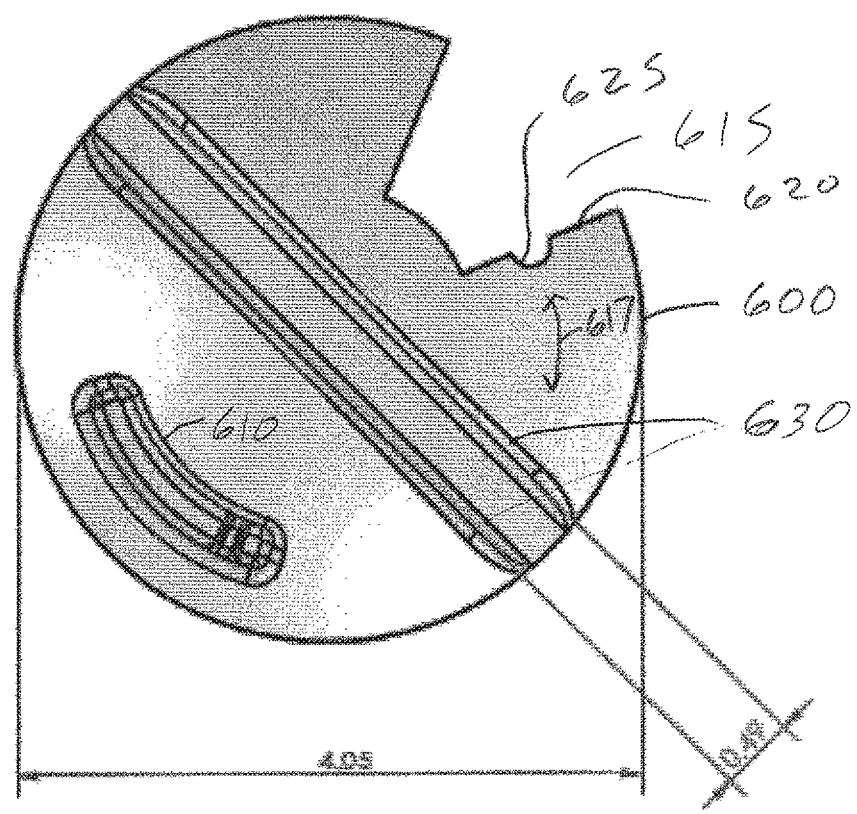
FIG. 6 is a top view of a bait container lid insert that rotates within the bait container lid of FIG. 3 according to an example embodiment.

FIG. 6 is a top view of a bait container lid insert 600 that rotates within the bait container lid 300 of FIG. 3 according to an example embodiment. As previously indicated, the insert 600 may snap fit within the ridge 330 of the lid 300, allowing it to rotate in a captured manner on the lid 300. In one embodiment, a curved groove 610 of limited length is formed on the insert 600 to mate with projection 325 to provide stops to control the amount of rotation of the insert 600. Insert 600 contains an open section 615, which may have dimensions similar to opening 310, providing access to the bait container when lined up with opening 310, as permitted by the groove 610 length and position with respect to projection 325, and to close access to the bait container when rotated to cover the opening 310 as indicated by curved arrow 617.

In one embodiment, the opening 615 may have a leading cutting edge 620, which may optionally have an insert guide 625 shaped similarly to guide 315 to mate therewith when rotating the insert to cut the bait. The guide 625 is optional, or may even be used instead of guide 315 to guide the user in placing the bait and holding the bait in position when cutting the bait. The guide 625 may also facilitate one handed operation of the insert, with one hand holding the bait in the guide and also providing force to rotate the insert and cut the bait. To further aid the user in rotating the insert 600, one or more protrusions 630 may be provided to give a user a protruding surface to push against. The protrusion 630 in one embodiment is a straight ridge extending across the insert 630 and may also provide enhanced structural integrity. In further embodiments, the protrusions may be shorter, shaped differently, or may even be eliminated, with the grove 610 providing an adequate surface for a user to push against to rotate the insert 600.

In one embodiment, the grove 610 may have one or more flexible narrow positions to provide resistance to rotation of the insert at desired positions by providing additional friction via the projection 325 being slightly wider than a width of the groove 610 at such positions. One such position may include a position of the insert 600 where the insert is completely covering the opening 310. Other positions may be included as desired.

Figure 7:
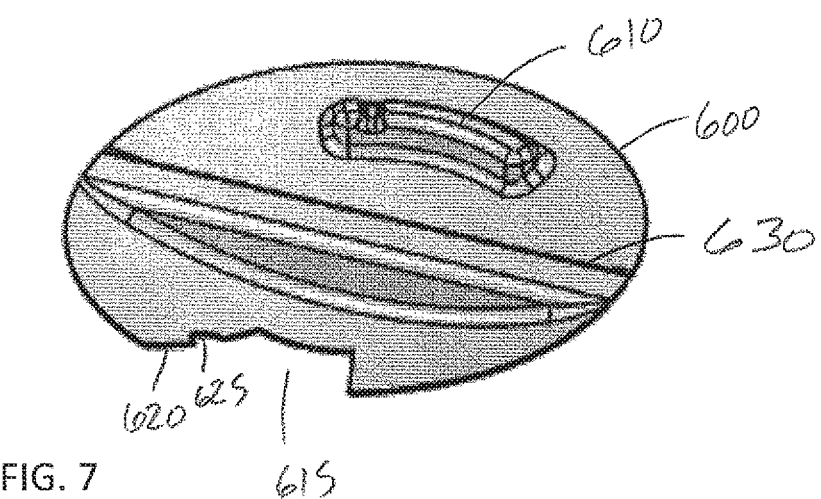
FIG. 7 is a perspective view of the bait container lid insert of FIG. 6 according to an example embodiment.

FIG. 7 is a perspective view of the bait container lid insert 600 of FIG. 6. The ridge 630 is more clearly illustrated in this view, as is the dome shaped structure of the insert 600. The ridge 630 is more pronounced in a middle of the insert 600 as the insert slopes away from a plane defined by the circumference of the insert 600.

Figure 8:
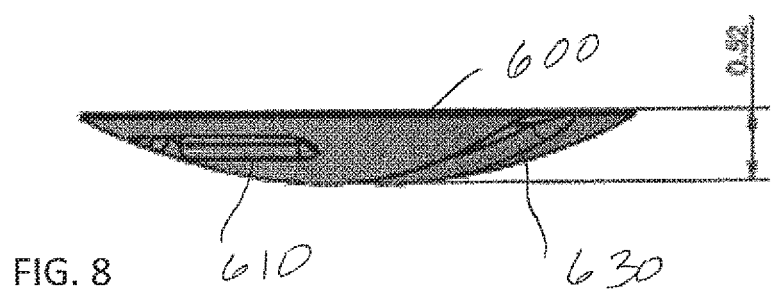
FIG. 8 is a side view of the bait container lid insert of FIG. 6 according to an example embodiment.

FIG. 8 is a side view of the bait container lid insert 600 of FIG. 6 illustrating the dome shape that is formed to mate with the dome shape of the lid 300 when the insert 600 is captured within the lid 300.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A bait holder comprising: a bait container having a lip; a lid having a lip to mate with the bait container lip, the lid further having a lid opening positioned to provide access to an inside of the bait container, wherein the lid includes a projection; and an insert rotatingly captured by the lid, the insert including an insert opening having a first position exposing the opening and a second position covering the opening to seal the container, the insert comprises a groove configured to mate with the projection and provide stops for movement of the insert with respect to the lid, and the insert opening having a leading edge configured to cut bait protruding from the container through the lid opening when the insert opening is rotated from the first position to the second position.

2. The bait holder of claim 1 wherein the lid opening includes a lid bait guide positioned to guide placement of bait to be cut.

3. The bait holder of claim 2 wherein the insert opening includes an insert bait guide positioned to guide placement of bait to be cut.

4. The bait holder of claim 3 wherein the lid bait guide and insert bait guide are positioned to guide the bait to the same position during cutting of the bait by rotation of the insert.

5. The bait holder of claim 1 wherein the lid and insert have mating dome shapes.

6. The bait holder of claim 1 wherein the insert opening includes an insert bait guide positioned to guide placement of bait to be cut.

7. The bait holder of claim 1 wherein the groove has an arcuate shape with a constant radius.

* * * * *